United States Patent [19]

Kingett et al.

[11] Patent Number: 5,062,256
[45] Date of Patent: Nov. 5, 1991

[54] HORSE TAIL COVER AND METHOD

[76] Inventors: Betty M. Kingett, Lindenwold, N.J.; Donald L. Kingett, executor, c/o Kulzer & di Padova 76 Euclid Ave., Haddonfield, N.J. 08033; Kingett, III, executor Albert E., Box 253 C Cohawkin Rd., Sewell, N.J. 08080

[21] Appl. No.: 416,487
[22] Filed: Oct. 3, 1989
[51] Int. Cl.⁵ .............................. B68B 5/04
[52] U.S. Cl. ...................................... 54/78
[58] Field of Search ............... 54/78, 79; 129/67, 105

[56] References Cited

U.S. PATENT DOCUMENTS

| | | | |
|---|---|---|---|
| 212,836 | 3/1879 | Briggle | 54/78 |
| 1,483,367 | 3/1874 | Howard | 54/78 |
| 2,128,498 | 8/1938 | Ottley | 54/78 |
| 2,150,526 | 3/1939 | Swaggerty | 54/78 |
| 2,487,005 | 11/1949 | Walker | 54/78 |
| 2,508,117 | 5/1950 | Lavery, Sr. | 54/78 |
| 2,740,380 | 4/1956 | Johnson | 119/105 |
| 3,347,018 | 10/1967 | Laidig | 54/78 |

FOREIGN PATENT DOCUMENTS

| | | |
|---|---|---|
| 218841 | 5/1909 | Fed. Rep. of Germany . |
| 2460228 | 1/1981 | France . |
| 7403 | of 1838 | United Kingdom . |

Primary Examiner—Robert P. Swiatek
Attorney, Agent, or Firm—Beveridge, DeGrandi & Weilacher

[57] ABSTRACT

A horse tail cover and method are provided to cover the horse's tail being readied for dressage and other show competitions. The device includes a tubular cover formed of a single cloth panel attached lengthwise with VELCRO patches and closed at the top and the bottom with VELCRO attachments. A strap attachment including a single long strap looping around the horse's chest, over its back, with a cross strap across the back, and VELCRO attachments on the end of the strap which attach to the upper end of the tubular cover.

11 Claims, 3 Drawing Sheets

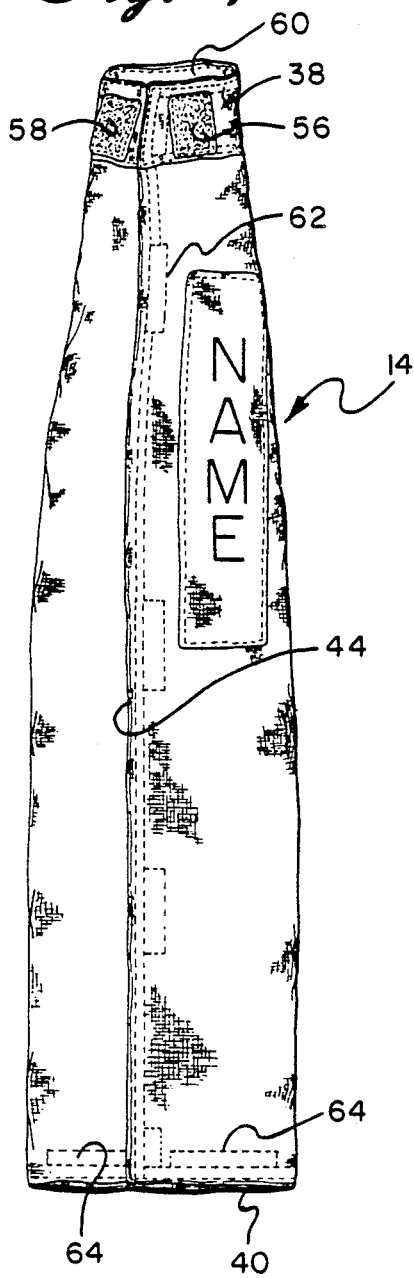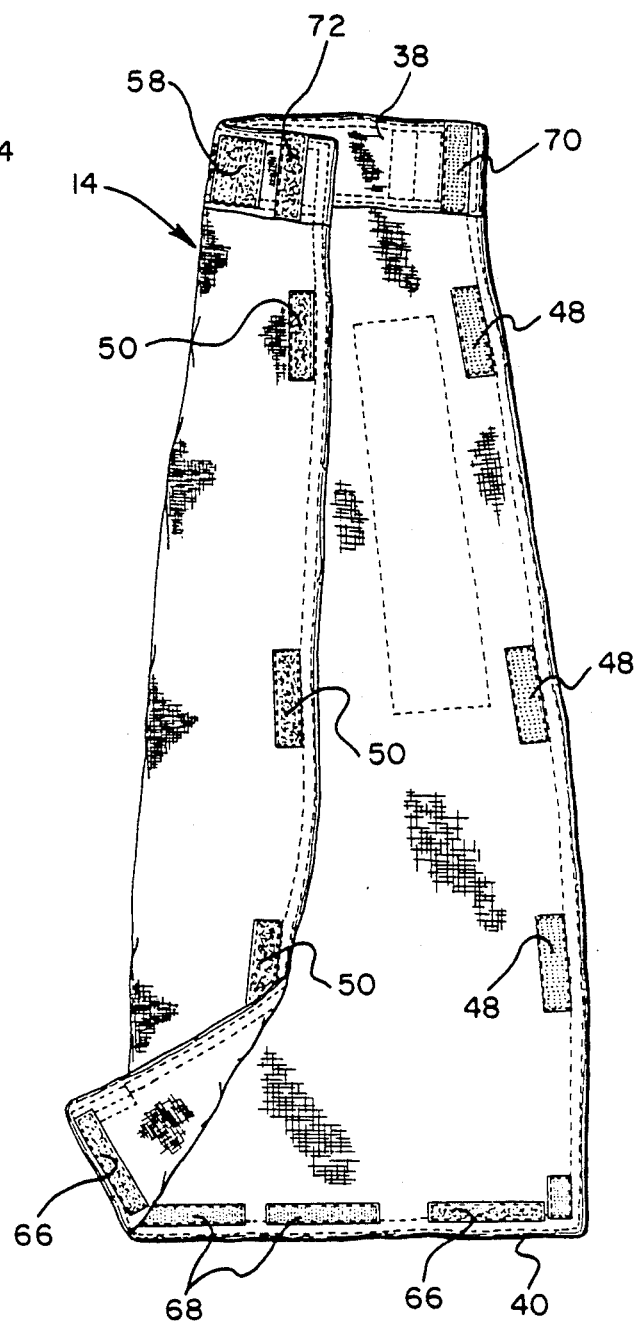

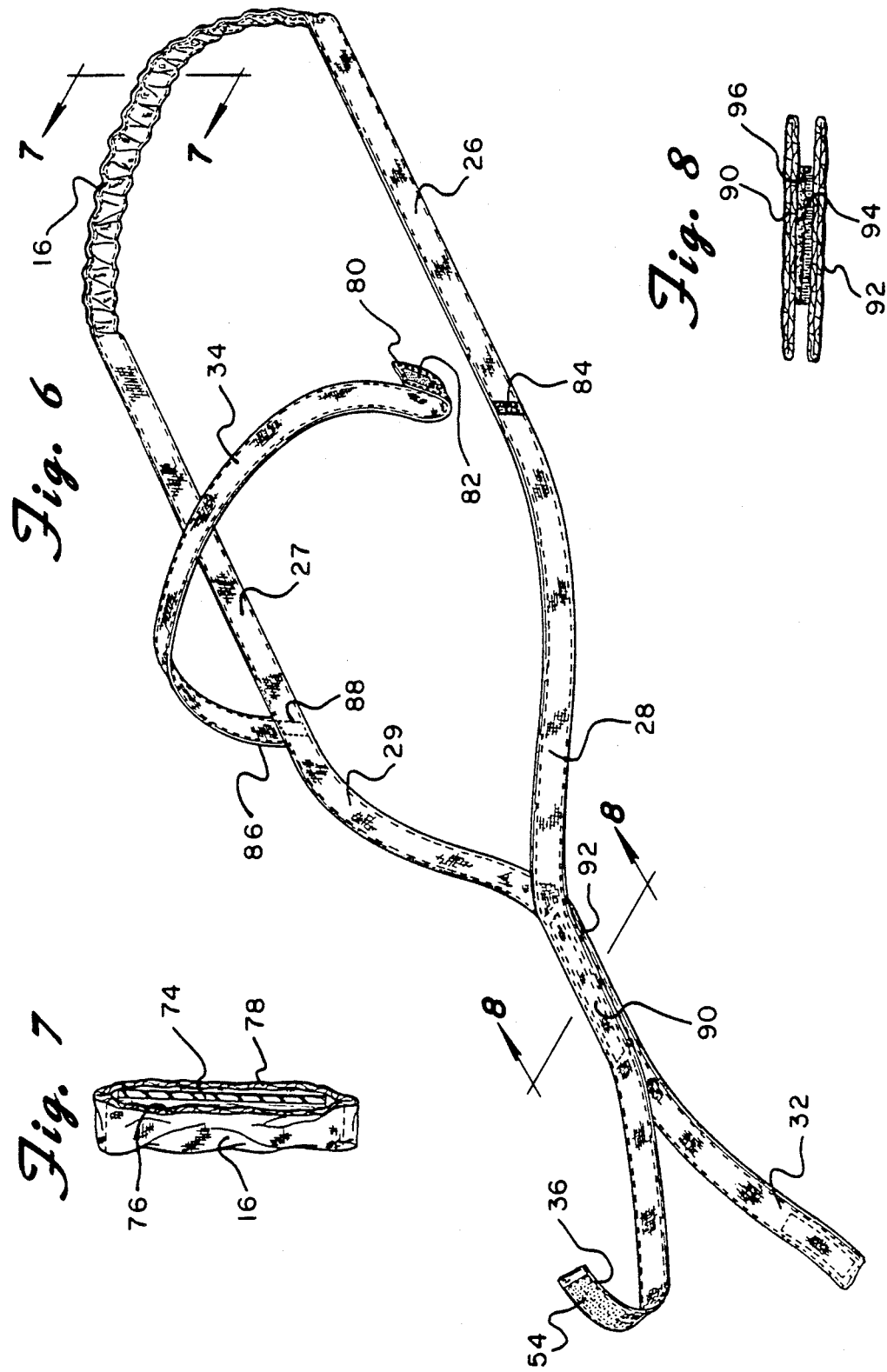

HORSE TAIL COVER AND METHOD

BACKGROUND OF THE INVENTION

This invention involves a cover for a horse's tail, but is particularly suitable for show horses.

The riding of horses in shows for dressage to compete with other horses and riders to display the talents of the horse and rider is an ever increasing popular sport. In one form of dressage competition the performance of various gaits and steps that have been laboriously taught to the horse are judged. Further, horse jumping in shows is also extremely popular, particularly for young men and women with the considerable support from their families. The sports are sufficiently popular to be included in the international Olympic program.

The appearance of the horse is very important to the participants and grooming the horse requires a major effort not only on a daily basis for regular grooming, but with particular emphasis and effort immediately before any show. A good deal of time is spent on the tail of the horse. Because of its location and the continuous use by the horse to discourage inserts, the tail tends to become dirty and tangled almost immediately after grooming, almost always requiring a major last minute effort to properly clean, brush and prepare the horse's tail.

No satisfactory solution to this problem has been provided with the only present answer being to stuff the tail into a long sock. This answer as well as any other devices do not satisfy the problem nor do the devices or methods attain the objects described herein below.

SUMMARY OF THE INVENTION

It is an object of the present invention to provide a cover device for the horse's tail to prevent the hair from becoming entangled and dirty after cleaning and prior to showing the horse.

It is an additional object of the invention to provide a device which protects the tail, while allowing natural movement of the tail by the horse.

It is an additional object of the invention to provide an attachment device for the cover of the horse's tail that avoids any restriction of the horse's movement which might tend to excite or upset the horse prior to the show.

It is an additional object of the invention to provide a cover with an attachment to the horse which essentially prevents the horse from rubbing or dislodging the device.

It is an additional object of the present invention to provide a cover and a method which is easy to put on the horse while minimally exciting the horse during the application.

It is a particular object of the present invention to provide a cover device for the horse's tail which is not bothersome to the horse such that the horse's skin or his attitude will become irritated.

It is an particular object of the present invention to provide a cover device that is constructed of light weight fabric that is not stiff or constricting to aid in the comfort of the horse.

It is an additional object of the invention to provide a cover device for the horse's tail that will stay on and not slip down during the horse's movements or activities.

It is a further object of the present invention to provide a horse tail cover which adjust to a degree to the size of the horse.

The invention is a device to cover a horse's tail that includes a cloth panel that includes a top edge, a bottom edge, and two lengthwise edges. The device also includes lengthwise edge attachment means to detachably attach the lengthwise edges together to form the cloth panel into a tubular shape. The device further includes top edge attachment means to detachably attach the top edge together to partially close off the top edge of the tubular shaped cloth panel, and strap attachment means to attachable proximate the top edge comprising a strap of sufficient length to extend from the top of horse's tail over the horse's back, over the horse's chest above the horse's shoulders, and over the back to the top of the horse's tail, to hold the cloth panel up under the horse's tail.

It is preferred that the device further include a bottom edge attachment means to detachably attach the bottom edge together to close off the bottom edge of the tubular shaped cloth panel. It is also preferred that all the attachment means include opposing complimentary detachable attachment strips of hook and loop fabric. It is further preferred that the strap means be attachable through opposing complimentary detachable attachment strips of hook and loop fabric on the strap and on the cloth panel. It is also preferred that the strap means include an elastic section proximate a median section of the strap. It is further preferred that the strap means include a cross strap attachable at both ends to two positions on the strap positioned such that the cross strap will rest across the horse's back from side to side. It is also preferred that the strap means include two sections of the strap which overlap on the horse's back when the strap means is fastened on the horse, and the attachment strips of hook and loop fabric on the opposing surfaces of the two over lapping sections of the strap.

The invention is also a method to cover a horse's tail including providing a cloth panel that includes a top edge, a bottom edge, and two lengthwise edges. The method further includes providing a strap means to fasten the cloth panel under the horse's tail, the strap means including a strap includes a length, a median section, and two ends, the length being sufficient to extend from the top of horse's tail over the horse's back, around, over the horse's chest above the horse's shoulders, and back the top of the horse's tail. The method also includes looping the median section of the strap around the horse's chest and placing the ends of the strap on the horse's back above the top of the horse's tail. The method further includes holding the cloth panel in open position up under the horse's tail, and detachably attaching the ends of the strap to the cloth panel proximate the top edge. The method further includes folding the lengthwise edges of the cloth panel together over and around the horse's tail enclosing the horse's tail and detachably attaching the top edge together to partially close off the top edge of the tubular shaped cloth panel around the top of the horse's tail. The method finally includes detachably attaching the lengthwise edges together to form the cloth panel into a tubular shape enclosing the horse's tail.

It is preferred that the method further comprising include attaching the bottom edge together to close off the bottom edge of the tubular shaped cloth panel. It is also preferred that all the detachably attaching include detachably attaching of opposing complimentary patches of hook and loop fabric attached to the parts being joined. It is further preferred that the strap means further include an elastic section proximate the median section of the strap fitted over the horse's chest. It is also preferred that the strap means further include a cross strap attachable at both ends to two positions on the strap and the method further includes attaching the cross strap to the strap resting across the horse's back from side to side. It is further preferred that the strap means further include two sections of the strap with attachment strips of hook and loop fabric on the opposing surfaces of the two sections, and the method further includes attaching the over lapping sections of the strap laying on the horse's back.

BRIEF DESCRIPTION OF THE DRAWINGS

FIG. 4 is a perspective view of the tubular covering of the device illustrated in FIGS. 1 through 3 in the closed position.

FIG. 5 is a perspective view of the tubular covering illustrated in FIG. 4 in the open position.

FIG. 6 is a perspective view of the strap portion of the device illustrated in FIGS. 1 through 3.

FIG. 7 is a cross-sectional view taken along lines 7—7 of FIG. 6.

FIG. 8 is a cross-sectional view taken along lines 8—8 of FIG. 6.

DESCRIPTION OF PREFERRED EMBODIMENTS

Figure 1:
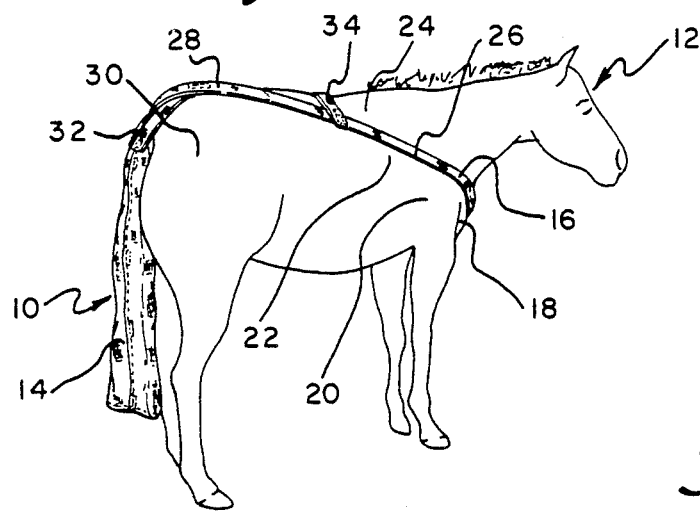
FIG. 1 is a perspective view of a horse on which a device of the present invention has been applied.
Figure 3:
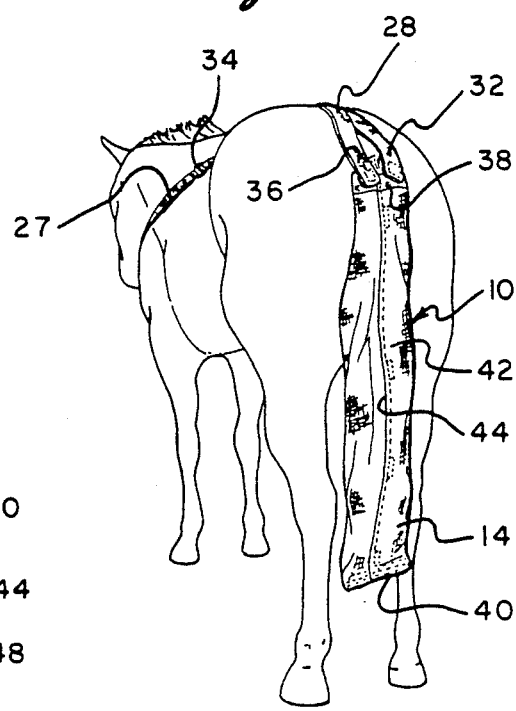
FIG. 3 is a perspective view of the hind quarters of the horse showing the device illustrated in FIG. 1 in the closed tail covering position.
Figure 2:
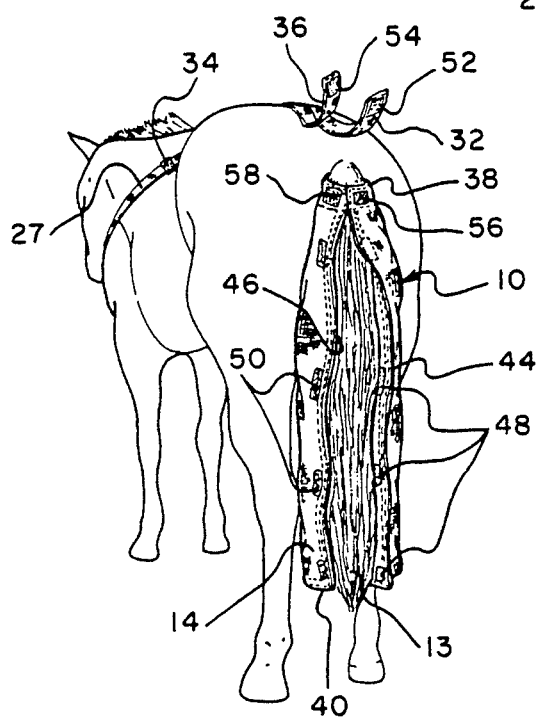
FIG. 2 is a perspective view of the hind quarters of the horse with the device illustrated in FIG. 1 in the process of being put on, to cover the horse's tail and attach it to the horse.

In FIG. 1, tail covering device 10 including tubular tail cover 14 and the strap attachment device is shown as being worn by horse 12. The strap device which holds tubular cover 14 under and around the horse's tail includes front median section 16 of the strap which passes over the horse's chest 18 above shoulder 20 lying on withers 22 and extending over the horse's back 24. Median section 26 of the strap extends over the right shoulder of the horse, while median section 27, hidden in this view, extends over the left shoulder of the horse. The rear section of the strap is close to the ends of the strap, with end 32 being shown in this view. This strap is one long continuous strap being about 150 inches long having one end 32 positioned above the horse's tail extending forwardly to rear section 28 on the back of the horse and further forwardly to median section 26 over the withers to front median section 16, which is essentially at the middle of the long single strap over chest 18 of the horse. The strap continues around the horse's chest over the left withers up over the back and terminating at end 36 shown in FIGS. 2 and 3 terminating above the tail of the horse on hind quarters 30. Cross strap 34 connects the two portions of the strap over back 24 of the horse. As shown in FIG. 2, tubular bag 14 is placed under the horse's tail in the open position and top edge 38 is closed around the upper portion of the tail. Lengthwise edge 44 having hook VELCRO patches 48 positioned along the lengthwise edge is pulled around the horse's tail and over lengthwise edge 46 which has loop VELCRO patches 50 spaced along its length. The VELCRO patches are positioned to match and interconnect enclosing the tail as lengthwise edges 44 and 46 are attached together. Bottom edge 40 is also closed together to completely encase the horse's tail. Strap ends 32 and 36 have hook VELCRO patches 52 and 54 thereon respectively which interconnect and attach to loop VELCRO patches 56 and 58 proximate upper edge 38 of tubular cover 14. FIG. 3 illustrates the tubular cover 14 in a closed position with lengthwise edge 44 now mated and attached to lengthwise edge 46 hidden it in this view. Median section 27 of the strap extending over the left withers of the horse is shown in these views. The straps and tubular cover are constructed of a light weight twill fabric, preferably cotton or a cotton blend with polyester or nylon. The fabric is chosen to resist dirt and have a tight weave such that it is not easily snagged or torn. The fabric is also washable and sufficiently supple that it does not resist bending and forms to the horse's contour as well as movement of the horse's tail.

FIGS. 4 and 5 show tubular cover 14 in an expanded view, first in the closed position and secondly in the open position. In the closed position, the attachment of VELCRO straps, illustrated later, at upper edge 38 forms reduced diameter opening 60 at the top end of the tubular shape. Stitching 62 shows the position of patches 48 along the underside of edge 44. Stitching 64 holds on patches 66 and shows their position along lower edge 40. In FIG. 5, tubular shape 14 is opened up, as it would applied under the horse's tail and attached to strap ends 32 and 36 to loop VELCRO patches 56 and 58, the former hidden in this view but shown in FIG. 4. To close the upper end of tubular shape 14, hook VELCRO patch 70 interlocks with loop patch 72 to form the reduced diameter 60 to grip the upper end of the tail.

FIG. 5 shows a closer view of hook VELCRO patches 48, positioned to match and interlock with loop VELCRO patches 50 along edges 44 and 46 respectively. Loop VELCRO patches 66 positioned along bottom edge 40 connect and attach with hook VELCRO patches 68 to close the bottom edge of tubular shape 14. The length of tubular shape 14 is about three to four foot long and is preferably about 40 inches in length. In FIG. 3, the horse's tail 13 is shown of a length extending past lower edge 40. This drawing shows the tail at that length for clarification purposes and normally the tail is shorter than the length of tubular shape 14. However, should the tail be slightly longer than the tubular shape, it is a simple matter to lift the tail while closing bottom edge 40 of VELCRO strips 66 and 68 to prevent soil from reaching the end of the tail.

In FIG. 6, the strap configuration is about 76 inches long from front median section 16 to ends 32 and 36. This length will vary to fit different size horses and may be supplied in varying sizes with the VELCRO attachment providing some degree of adjustability for minor size differences. Front median section 16 of the strap is elasticized as shown in the cross-sectional view of FIG. 7, wherein outside fabric layers 76 and 78 sandwich elastic strap 74 to snug the strap onto the horse and provide some adjustment for size. From the front of the horse and the median portion of the strap, the strap continues rearwardly on both sides of the horse through median sections 26 and 27. On these median sections 26 and 27 passing over the withers and to the back, are positioned loop VELCRO patches of which is shown loop patch VELCRO 84 on median section 26. Stitching 88 on section 27 shows the position of a second loop VELCRO patch on which is attachable end 86 of cross strap 34 which has on that end a hook VELCRO patch to interconnect and hold the cross strap to the main strap section. Hook patch 82 is attached on the underside of end 80 of cross strap 34 to attach to loop VELCRO patch 84. The rear section of the strap, sections 28 and 29, extend over the back and overlap with VELCRO attachment between the two surfaces. Section 90 is the overlap section being portioned between section 28 and end 36 and section 92 is between section 29 and end 32. In the cross sectional view of FIG. 8, hook VELCRO strip 94 is stitched to section 92 and interlocks with loop VELCRO strip 96 stitched to section 90. This overlap at sections 90 and 92 forms a somewhat uneven "FIG. 8" shape with one large loop around the horse's shoulders and over the back and the rear portion essentially overlapping but spreading slightly to connect with upper edge 38 of tubular cover 14.

While this invention has been described with reference to the specific embodiments disclosed herein, it is not confined to the details set forth and the patent is intended to include modifications and changes which may come within and extend from the following claims.

I claim:
1. A device to cover a horse's tail comprising:
   (a) a cloth panel comprising:
      (i) a top edge,
      (ii) a bottom edge substantially parallel to said top edge, and
      (iii) two lengthwise edges,
   (b) lengthwise edge attachement means to detachably attach the lengthwise edges together to form the cloth panel into a tubular shape,
   (c) top edge attachment means to detachably attach portions of the top edge together to partially close off and reduce the diameter of the top edge of the tubular shaped cloth panel,
   (d) strap means attachable proximate the top edge comprising a strap of sufficient length to extend from the top of horse's tail over the horse's back, over the horse's chest above the horse's shoulders, and over the back to the top of the horse's tail, to hold up the cloth panel up under the horse's tail, and
   (e) a means to detachably attach at least end portions of said bottom edge together to close off said bottom edge of said tubular shaped cloth panel.

2. The device of claim 1 wherein the attachment means comprise opposing complementary detachable attachment strips of hook and loop fabric.

3. The device of claim 1 wherein the strap means is attachable through opposing complementary detachable attachment strips of hook and loop fabric on the strap and on the cloth panel.

4. The device of claim 1 wherein the strap means comprises an elastic section proximate a median section of the strap.

5. The device of claim 1 wherein the strap means comprises a cross strap attachable at both ends to two positions on the strap positioned such that the cross strap will rest across the horse's back from side to side.

6. The device of claim 1 wherein the strap means comprises two sections of the strap which overlap on the horse's back when the strap means is fastened on the horse, and attachment strips of hook and loop fabric on the opposing surfaces of the two overlapping sections of the strap.

7. A method to cover a horse's tail comprising:
   (a) providing a cloth panel comprising:
      (i) a top edge,
      (ii) a bottom edge substantially parallel to said top edge, and
      (iii) two lengthwise edges,
   (b) providing a strap means to fasten the cloth panel under the horse's tail, the strap means comprising a strap comprising a length, a median section, and two ends, the length being sufficient to extend from the top of horse's tail over the horse's back, around, over the horse's chest above the horse's shoulders, and back to the top of the horse's tail,
   (c) looping the median section of the strap around the horse's chest and placing the ends of the strap on the horse's back above the top of the horse's tail,
   (d) holding the cloth panel in open position up under the horse's tail,
   (e) detachably attaching the ends of the strap to the cloth panel proximate the top edge,
   (f) folding the lengthwise edges of the cloth panel together over and around the horse's tail enclosing the horse's tail,
   (g) detachably attaching portions of the top edge together to partially close off the top edge of the tubular shaped cloth panel around the top of the horse's tail,
   (h) detachably attaching the lengthwise edges together to form the cloth panel into a tubular shape enclosing the horse's tail, and
   (i) detachably attaching at least end portions of said bottom edge together to close off said bottom of said tubular shaped cloth panel.

8. A method to cover a horse's tail comprising:
   (a) providing a cloth panel comprising:
      (i) a top edge,
      (ii) a bottom edge, and
      (iii) two lengthwise edges,
   (b) providing a strap means to fasten the cloth panel under the horse's tail, the strap means comprising a strap comprising a length, a median section, and two ends, the length being sufficient to extend from the top of horse's tail over the horse's back, around, over the horse's chest above the horse's shoulders, and back the top of the horse's tail,
   (c) looping the median section of the strap around the horse's chest and placing the ends of the strap on the horse's back above the top of the horse's tail,
   (d) holding the cloth panel in open position up under the horse's tail,
   (e) detachably attaching the ends of the strap to the cloth panel proximate the top edge,
   (f) folding the lengthwise edges of the cloth panel together over and around the horse's tail enclosing the horse's tail,
   (g) detachably attaching the top edge together to partially close off the top edge of the tubular shaped cloth panel around the top of the horse's tail,
   (h) detachable attaching the lengthwise edges together to form the cloth panel into a tubular shape enclosing the horse's tail, and
   (i) detachably attaching said bottom edge together to close off said bottom of said tubular shaped cloth panel.

9. The method of claim 7 wherein the strap means further comprises an elastic section proximate the median section of the strap fitted over the horse's chest.

10. The method of claim 7 wherein the strap means further comprises a cross strap attachable at both ends to two positions on the strap and the method further comprises attaching the cross strap to the strap resting across the horse's back from side to side.

11. The method of claim 7 wherein the strap means further comprises two sections of the strap with attachment strips of hook and loop fabric on the opposing surfaces of the two sections, and the method further comprises attaching the over lapping sections of the strap laying on the horse's back.

* * * * *